United States Patent [19]
Baker

[11] 4,015,726
[45] Apr. 5, 1977

[54] HAY LOADER

[76] Inventor: Clinton F. Baker, 109 S. 8th St., Fredonia, Kans. 66736

[22] Filed: Mar. 17, 1975

[21] Appl. No.: 559,028

[52] U.S. Cl. .............................. 214/77 R; 212/8 R; 214/147 R; 214/6 B
[51] Int. Cl.² ........................................ B60P 1/48
[58] Field of Search ............ 214/77 R, 78, 80, 6 B, 214/147 R, 147 G; 212/8 R, 8 B, 9

[56] References Cited
UNITED STATES PATENTS

| 2,521,832 | 9/1950 | Cordivano | 214/77 R X |
| 2,962,177 | 11/1960 | Pridgeon | 214/147 G |
| 3,048,288 | 8/1962 | Dwyer | 214/147 G |
| 3,072,271 | 1/1963 | Costello | 214/77 R |
| 3,420,564 | 1/1969 | Jensen | 294/88 X |
| 3,458,066 | 7/1969 | Klaus | 214/77 R |
| 3,854,609 | 12/1974 | Cox | 214/147 G |
| 3,876,093 | 4/1975 | Carriere | 214/147 R |

FOREIGN PATENTS OR APPLICATIONS

| 826,310 | 1/1938 | France | 214/77 R |
| 899,484 | 6/1962 | United Kingdom | 214/77 R |

*Primary Examiner*—L. J. Paperner
*Attorney, Agent, or Firm*—Robert E. Breidenthal

[57] ABSTRACT

A hay loader employing an elongated support member carried by and extending horizontally between articulated supports positioned at the opposite ends of a wheeled cargo bed, each of the articulated supports including a primary arm having a fixed pivot at one end and having its other end pivoted to one end of a secondary arm, with the other end of the secondary arm being connected to the support member. Provision is made to move pivotally the primary arms in unison as is also done relative to the secondary arms. The longitudinal extent of the support member is provided with a plurality of units operable in unison selectively to engage and release hay.

15 Claims, 13 Drawing Figures

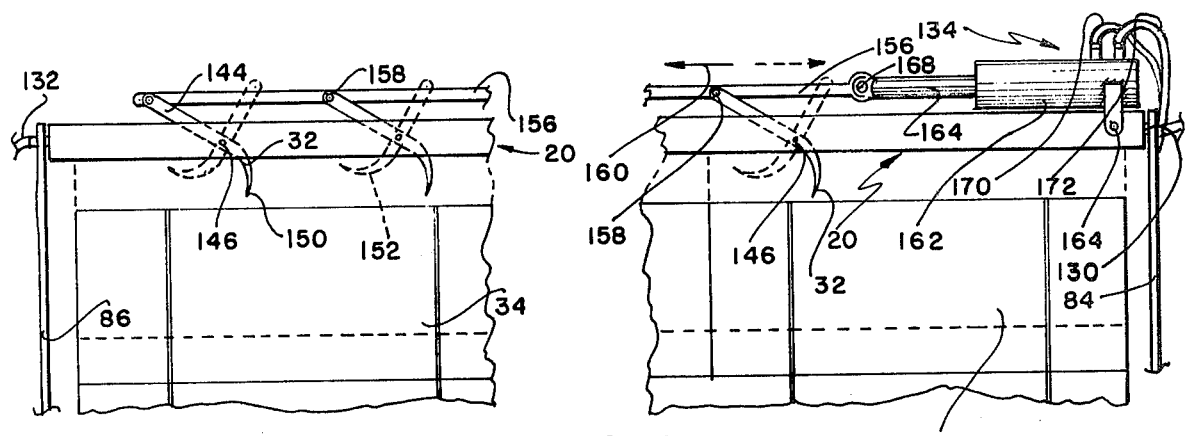
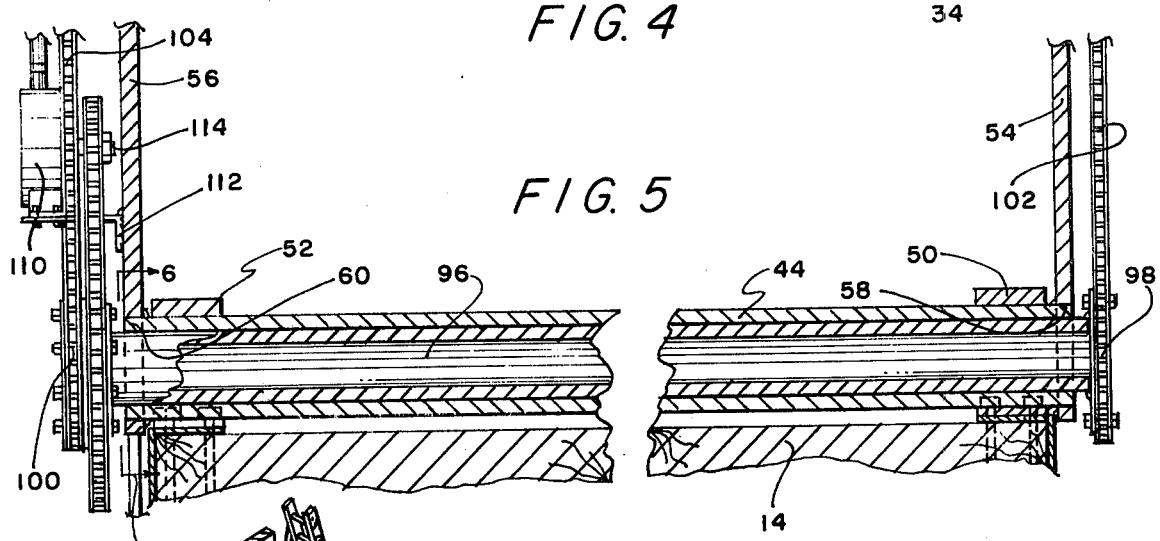
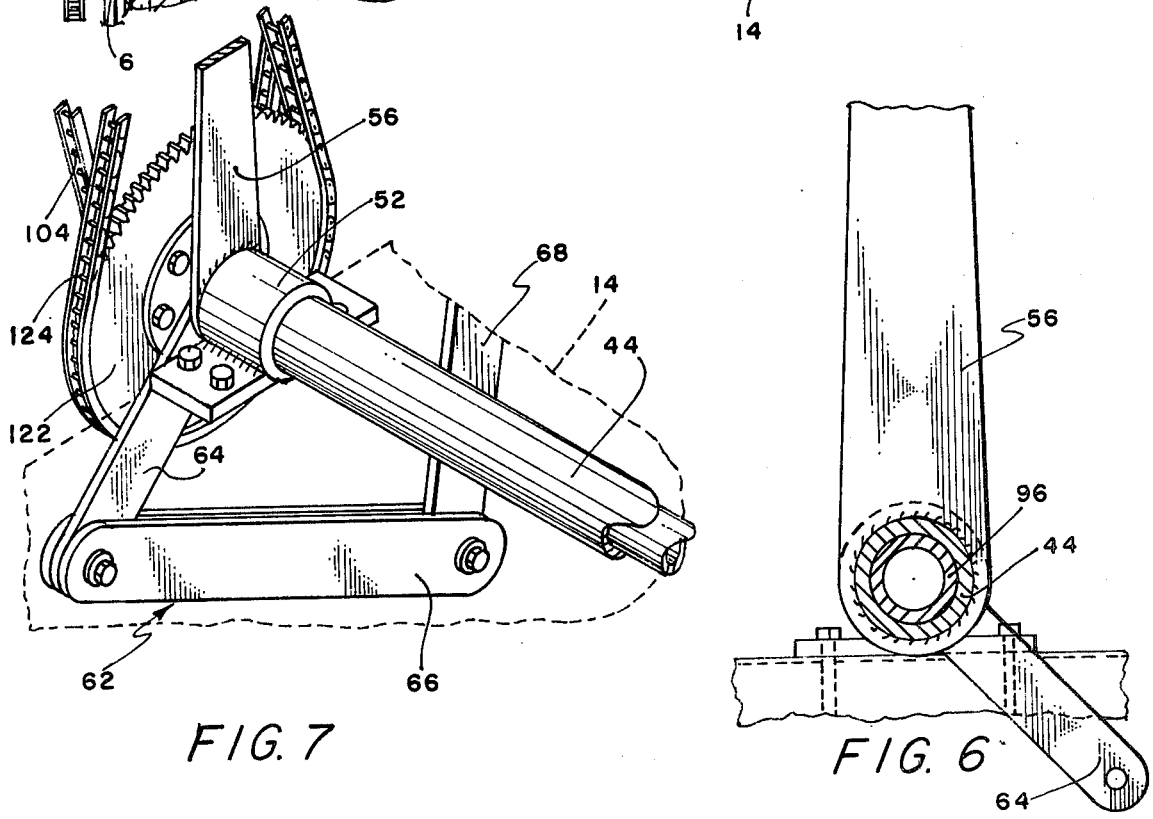

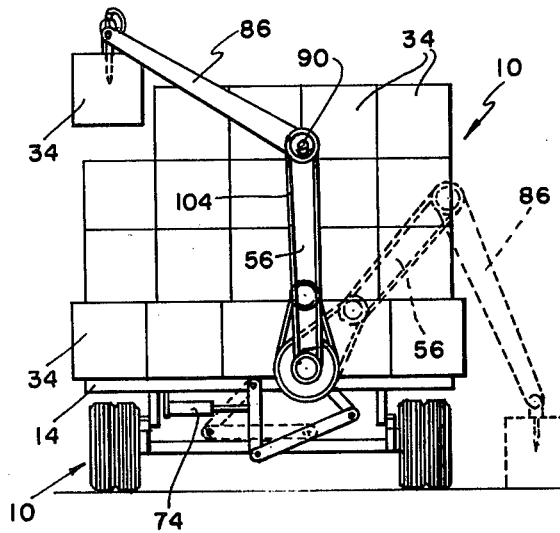
FIG. 10
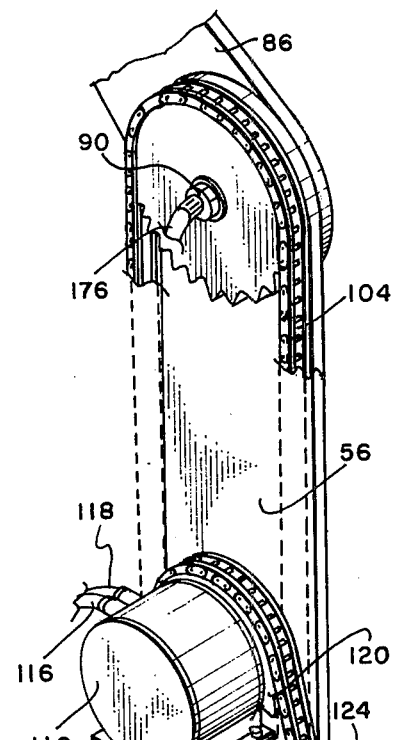
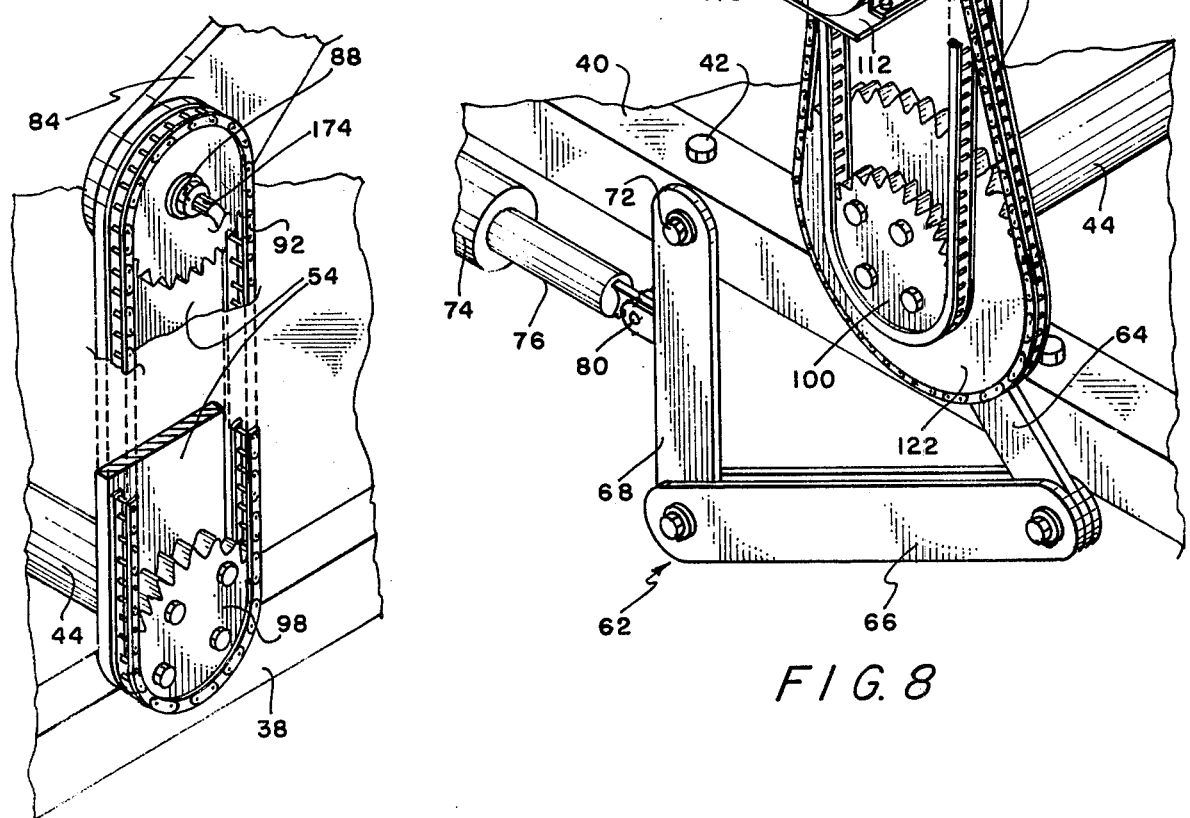
FIG. 9
FIG. 8

HAY LOADER

The present invention relates to new and useful improvements in loading apparatus and pertains more specifically to apparatus for handling "bites" of material of elongated character as, for example, a row of hay bales or an elongated mass of unconsolidated or loose hay.

The central arm of the present invention is to provide apparatus that can move an elongated and horizontal support member throughout a three-dimensional zone of substantial length, breadth and height while maintaining the spatial orientation of the same, and to also provide the longitudinal extent of the support member with depending means selectively operable to engage and to release whatever character of load may be at hand whether the latter may be fence or mine posts, crushed rock, loose or baled hay, etc. The latter means would be selected to be appropriate to the load, clam buckets, electromagnets, etc.

Inasmuch as the aim expressed above had its genesis in agricultural pursuits, the paramount objective of the invention has been to provide apparatus for handling hay, either baled or loose, as may be necessary in the transport, storage, or the feeding of cattle.

An appreciation of proposals heretofore made and affording a background understanding of related art can be obtained on reference to the following listed U.S. patents:

| | | |
|---|---|---|
| 3,616,949 | Klaus | Nov. 2, 1971 |
| 3,072,271 | Costello | Jan. 8, 1963 |
| 3,448,874 | Martinson | June 10, 1969 |
| 3,468,439 | Olitsky et al | Sep. 23, 1969 |
| 3,127,040 | Nieto, Jr. | Mar. 31, 1964 |
| 2,971,661 | Isaacs, Jr. | Feb. 14, 1961 |
| 2,771,197 | Leffler | Nov. 20, 1956 |
| 2,757,807 | Ringness | Aug. 7, 1956 |

A broad aspect of the invention involves in load handling apparatus, a horizontal and elongated support member having a spatial orientation of its longitudinal extent, power means for laterally translating the support member throughout a three-dimensional zone while maintaining the longitudinal spatial orientation thereof, load engaging means extending along and carried by the support member for selectively engaging and releasing a load, and means for operating said engaging means whereby a load of elongated form can be engaged at one location and moved to and released at a second location.

Another broad aspect of the invention involves a loading machine comprising a wheeled vehicle that includes a horizontal load carrying bed having opposite ends, an elongated and horizontal tubular shaft mounted on the vehicle to extend between the opposite ends of the bed and for oscillation about its longitudinal axis, a pair of upstanding parallel arms fixed to the opposite ends of the tubular shaft, a pair of secondary arms having inner ends pivoted to upper ends of the primary arms about a common axis that is parallel to the tubular shaft, said secondary arms being disposed on the sides of the primary arms nearest to each other and having outer ends, and an elongated horizontal support member parallel to the tubular shaft, with means connecting the opposite ends of the support member to the outer ends of the secondary arms, and means including a secondary shaft extending through the tubular shaft for maintaining the secondary arms parallel to each other, means for oscillating the tubular shaft and for effecting pivotal movement of the secondary arms relative to the primary arms, and means carried by and extending along the longitudinal extent of the support member for selectively engaging a load, whereby an elongated load can be loaded upon and removed from the bed throughout a zone having height and width respectively about twice and four times the length of a primary arm.

Manifestly, the principles of the invention can be employed with many types of load engaging units, and the invention is hereinafter disclosed relative to hay handling units as being exemplary of such a wide variety of utilizations through the disclosed hay handling units and the operating means therefor possess particular merit as will become manifest.

The invention will be best understood and appreciated in the light of the following description of two preferred embodiments thereof, such description being presented in conjunction with the accompanying drawings illustrative thereof, wherein:

FIG. 4 is a broken and fragmentary side elevational view of the support member and illustrates the relationship of the hydraulic actuator to the bale hooks, engaging and releasing positions of the latter being respectively shown in dashed and full lines;

FIG. 5 is a broken and fragmentary vertical sectional view taken along the axis of the concentric shafts and illustrating the drive connections thereof;

FIG. 6 is a vertical sectional detail view taken upon the plane of the section line 6—6 in FIG. 5;

FIG. 7 is an enlarged fragmentary isometric view of the drive connections to the concentric shafts with the cargo bed being partially outlined by dashed lines;

FIG. 8 is an isometric view generally similar to FIG. 7, but from the other side of the depicted structure;

FIG. 9 is a broken isometric view of structure at the end of the concentric shaft opposite that shown in FIG. 8 for drivingly connecting them to the primary and secondary arms;

FIG. 10 is a end view of the hay bale loader illustrating the loading of an upper tier of bales, such bales having been initially disposed on the ground with the bales in such initial position and initial apparatus position being shown in dashed outline;

Figure 11:
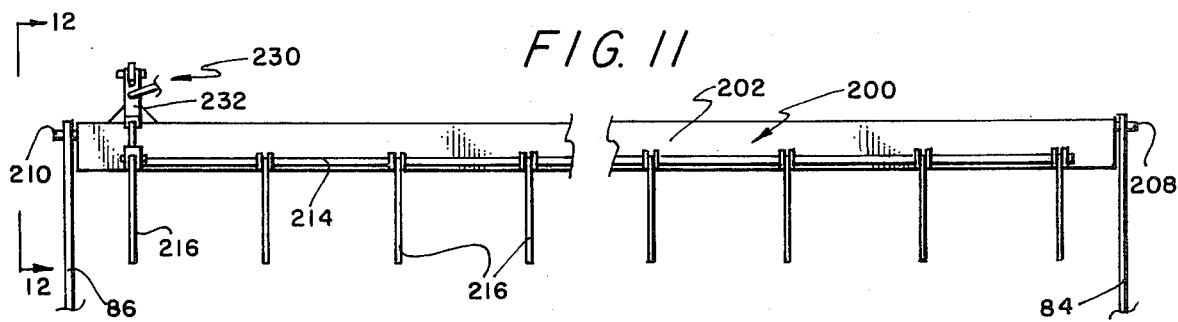
Figure 12:
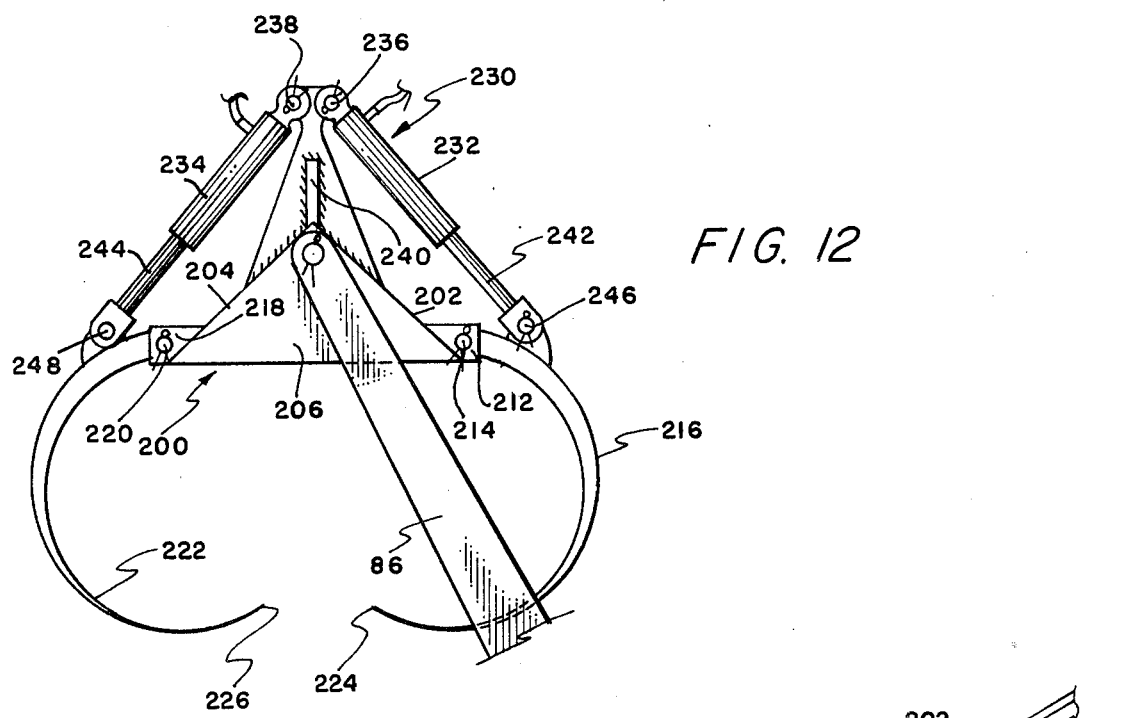
Figure 13:
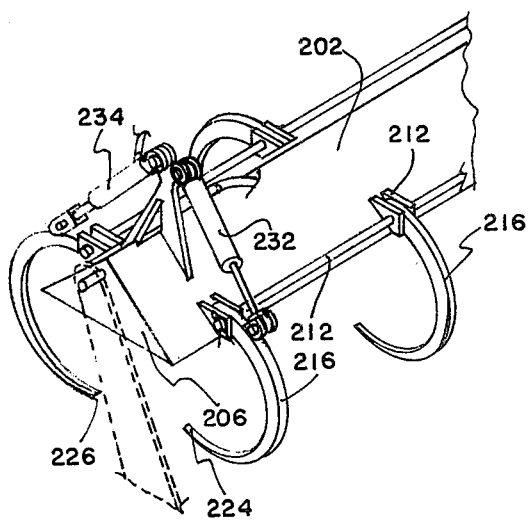

FIG. 11 through 13 pertain to an alternative form of load engaging and releasing unit for use in lieu of the bale loading units shown in FIGS. 1–10, with FIG. 11 being a broken elevational view of the same character as FIG. 4 and showing each unit as including a pair of opposed tines;

FIG. 12 is an enlarged end view taken upon the vertical plane of the line 12—12 in FIG. 11; and, FIG. 13 is a fragmentary isometric view of one end of the support member and of the hydraulic means for actuating the opposed tines of the units.

Referring now to the drawings wherein like numerals designate like parts throughout the various views, with attention being initially directed to the form of the invention shown in FIGS. 1–10, the reference numeral 10 designates the loading machine generally. The loader 10 comprises a wheeled vehicle 12 that includes a load carrying platform or cargo bed 14.

The vehicle 12 is provided with powered and interconnected forward and rear boom means 16 and 18 that carry and move an elongated and horizontal support member 20. The support member is provided with a plurality of units 22, 24, 26, 28 and 30 that include depending hay bale hooks 32 that are actuable to selectively engage and release hay bales of generally rectangular parallelepiped configuration such as those indicated at 34.

The vehicle 12 can simply be of wagon character with a towing tongue 36 as shown whereby the same can be towed by a truck, tractor, or the like (not shown) from one point of use to another, or if deemed expedient or desirable those conversant with the art will appreciate that the vehicles may be self-propelled, and the adaptation of the specifics of the embodiments hereinafter described to such other types of vehicles will be manifest.

The cargo bed 14 is horizontal and rectangular with its major dimension being that of the fore and aft dimension of the vehicle. The bed 14 is shown as not being provided with fixed or detachable upstanding side walls as illustration and description of such conventional provisions would only tend to obscure the unique features of the loader 10.

The specialized structure now to be described can be secured to the vehicle 12 so as to be a permanent part thereof, or can be detachably secured as shown so that the vehicle 12 may be utilized in ways possibly incompatible with such specialized structure.

The specialized structure includes a pair of steel frame members 38 and 40 detachably secured to the forward and rear ends of the bed 14 by bolts 42.

An elongated and horizontal hollow shaft 44 disposed intermediate and in parallelism to the opposite sides 46 and 48 of the bed 14 and is adjacent its opposite extremities journaled through a pair of aligned pillow bearings 50 and 52 suitably fixed to the frame members 38 and 40. The shaft 44 could be disposed below the bed 14 and in a permanent organization would preferably be so, however, the shaft 44 is most conveniently disposed above the top surface of the bed 14 with ample working clearance in a detachable system as disclosed which enables simple modification of extant vehicles.

Elongated boom members or primary arms 54 and 56 are fixed to the forward and rear end portions 58 and 60 of the tubular shaft 44, such as by welding, to extend radially therefrom in parallelism to each other. While shown as being perpendicular to the shaft 44, the arms 54 and 56 could be inclined, if desired or deemed expedient, to converge radially outward to a minor degree, though they should bear the same azimuthal relation to the axis shaft 44. The arrangement is such that the primary arms 54 and 56 are interconnected by the oscillatable tubular shaft to move angularly in unison about the axis of the shaft 44.

Power means 62 is provided to force angular movement of the shaft 44 and the arms 54 and 56 fixed thereto about the axis of the shaft 44 as well as to hold such parts at any selected angular position. The means comprises a lever 64 fixed to the shaft 44 to depend radially therefrom at a position rearwardly of the bed 14 and coplanar with the arm 56.

Figure 1:
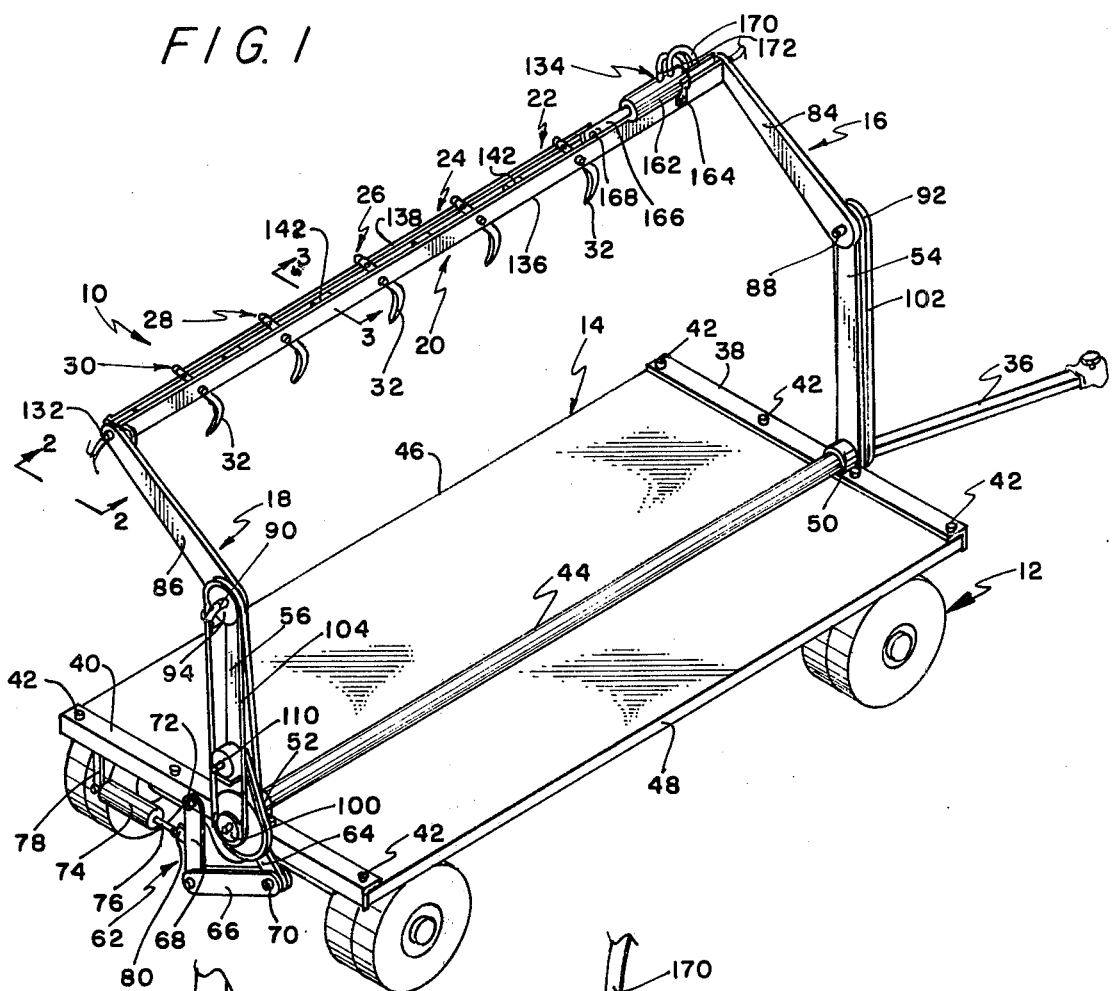
FIG. 1 is an isometric view of the hay bale loader.
Figure 2:
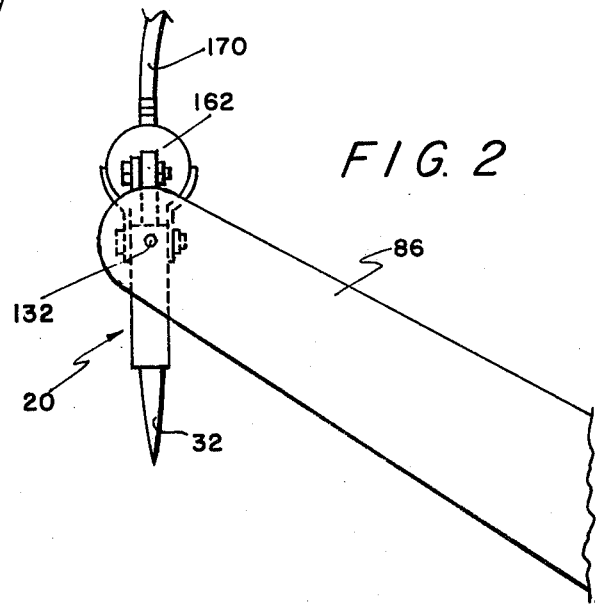
FIG. 2 is an enlarged fragmentary detail view taken from the vertical plane of the line 1—1 in FIG. 1.
Figure 3:
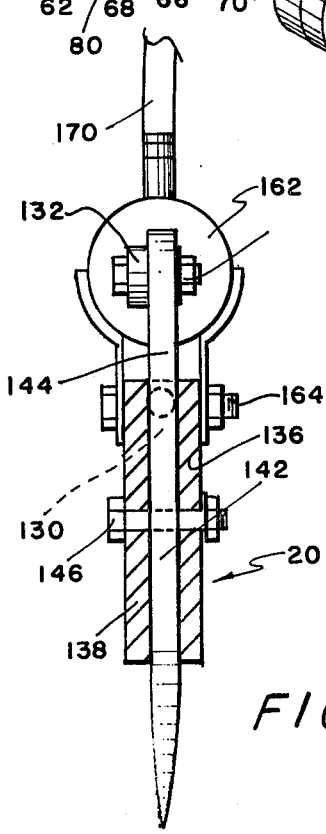
FIG. 3 is a still further enlarged view taken upon the plane of the section line 3—3 in FIG. 1.

Pivotally connected links 66 and 68 are in turn pivotally connected to the lever 64 and the frame member 40 respectively at 70 and 72 as clearly shown in FIG. 1. A double-acting hydraulic means including a cylinder 74 and an extensible piston rod 76 is provided; the cylinder 74 being generally horizontally disposed and having one end pivotally connected to a hanger 78 that rigidly depends from the frame member 40, and the free end of the piston rod 76 being pivotally secured to the link 68 as clearly shown at 80 in FIG. 8.

It will be readily understood that the hydraulic cylinder 74 is operatively associated with conventional hydraulic lines, pump, valving and operator control means (not shown) in the usual manner whereby the operator can force the shaft 44 in either direction about its axis and hold the same at any selected angular position. Such conventional means being omitted as illustration and description would obscure the invention as they do not in and of themselves constitute inventive subject matter. It should suffice at this point and be exemplary of the operation of the means 62 to note that retraction of the piston rod 76 will result in the primary arm 56 moving from the full line position shown thereof in FIG. 10 to the dashed line position shown thereof in such figure.

The boom means 16 and 18 each respectively include additional booms or secondary arms 84 and 86 that have rigidly fixed thereto hollow shafts 88 and 90 that are journaled through the primary arms 54 and 56. The secondary arms 84 and 86 are disposed adjacent the adjacent sides of their respective primary arms 54 and 56 so that the shafts 88 and 90, which are aligned and parallel to the shaft 44, extend in opposite directions in their being journaled through the primary arms 54 and 56, and the remote ends of the shafts 88 and 90 are respectively provided with sprocket wheels 92 and 94 that are fixed thereto for rotation therewith. In short, the arms 84 and 86 are pivoted to the arms 54 and 56, and the sprockets 92 and 94 are respectively fixed with respect to their respective arms 84 and 86. The reason for the shafts 88 and 90 being hollow will subsequently be explained.

Means inclusive of the sprockets 92 and 94 are provided to maintain the secondary arms 84 and 86 in parallelism to each other, or to bear the azimuthal relationship to the common axis defined by the aligned shaft 88 and 90. Such means comprises a shaft 96 rotatably and coaxially extending through the tubular shaft 44, and the opposite ends of the shaft 96 have sprockets 98 and 100 fixed thereto for rotation therewith, and endless chains 102 and 104 are respectively entrained over the pairs of sprockets 92 and 98 and 94 and 100. The sprockets 92 and 94 are identical to each other as are the sprockets 98 and 100. Preferably the sprockets 98 and 100 are smaller than the sprockets 92 and 94 to afford a torque mechanical advantage to the shaft 96 relative to the arms 84 and 86.

The shaft 96 is driven to rotate relative to the shaft 44 by means of a positive displacement hydraulic motor 110 of the reversible type mounted on a bracket 112 fixed to the primary arm 56. The positive displacement character of the motor 110 enables the same to drive its output shaft 114 forwardly and reversely as well as to hold the same against rotation, such motor 110 being connected to a conventional pump and operator control valving (not shown) by hydraulic lines partially shown at 116 and 118. Sprockets 120 and 122 are respectively non-rotatably fixed on the output shaft 114 and the shaft 96 and an endless chain 124 is entrained over such sprockets 120 and 122.

The outer ends of the boom means 16 and 18, specifically the free end portions of the secondary arms 84 and 86 hve rotatably journaled therethrough oppositely extending and aligned trunnions 130 and 132 that are provided at the forward and rear ends of the elongated load support member 20. The axis of the trunnions 130 and 132 parallel the axis of the concentric shafts 44 and 96. It should be noted at this point that the axis of the trunnions 130 and 132 is disposed above the center of mass of the member 20 combined with all the apparatus carried by the latter, namely, the units 22 through 30 and the power means 134 for actuating such units, whereby such support member 20 and structure carried does not substantially rotate about the axis of the trunnions 130 and 132 relative to the horizontal plane; this in a manner that is somewhat analogous to the chairs of a Ferris wheel remaining erect.

The support member 20 is comprised of a pair of spaced side rails 136 and 138 that are welded to spacer blocks 142 that are disposed therebetween and spaced along the extent of the member 20 between the rails 136 and 138.

The units 22 through 30 are essentially identical to each other and each comprises the bale hook 32 thereof as including an elongated integral shank 144 extending upwardly and slidable through the space between the rails and adjacent spacer blocks 142, and the shank 144 is, intermediate its ends, pivotally secured to the member 20 by a bolt 146 extending through the rails 136 and 138. The arrangement is such that the bale hook 32 can be oscillated about the horizontal axis (transverse to the extent of the member 20) defined by the bolt 146 by forces applied to the upper end of the shank 144 between a bale release position as shown thereof in FIGS. 1 and 4 wherein the hook 32 has its bale penetrating point portion 150 directed rearwardly and downwardly to a position wherein such point portion 150 is directed rearwardly and preferably slightly upwardly as shown in dashed outline in FIG. 4, this position being termed the bale engaging position such as will be appreciated will enable the lifting of any hay bale pierced by the hook 32. Plainly, movement of the hook 32 to the position shown in full lines will result in gravitational release of any bale pierced by the hook 32.

An elongated actuating rod 156 is disposed above the member 20 and is pivotally connected at 158 to the upper ends of the shanks 144 of each of said units 22–30, the arrangement being such that reciprocation of the rod 156 as suggested by the double-headed arrow 160 in FIG. 4 will actuate the hooks 32 of all the units 22–30 to operate in unison.

The power means 134 is operatively coupled to the rod 136 and comprises a double-acting hydraulic cylinder 162 pivotally mounted at 164 on the member 20 adjacent the forward end of the latter. The cylinder 162 is associated conventionally with an extensible and retractable piston rod 166 which has its free end pivotally connected to the rod 156 at 168. The hydraulic cylinder 164 is connected to suitable hydraulic control means (not shown) by hydraulic conduit means 170 and 172. Such hydraulic conduit means 170 and 172 respectively include rotary coupling means 174 and 176 that extend through the hollow shafts 88 and 90 respectively (see FIGS 8 and 9), whereby no limitation on the rotation of the secondary arms 54 and 56 is imposed by hydraulic conduit means as will be evident.

The character of suitable materials and of convenient and practical procedures for making the apparatus of the loader 10 should be self evident to those of usual familiarity with the art. Material such as are ordinarily employed in agricultural equipment including protective coatings are recommended in view of exposure to weather, etc. Ordinarily, steel is the preferred material with exposed parts appropriately being primed and painted with weather resistant finishes.

The use of the loader 10 will be readily understood. An entire row of hay bales can be placed on or removed from any of a plurality of tiers of hay bales on the bed 14, it being understood that such a row can extend all or any part of the longitudinal extent of the bed 14. This is possible for the reason that a member 20 can on appropriate angular movement of the shafts 44 and 96 about their common axis be moved throughout a large generally semicylindrical region or zone overlying the entire bed 14 as well as space laterally to the sides of and below the plane of the bed 14, it being noted that primary arms 54 and 56 (which are preferably somewhat longer than the secondary arms 84 and 86) have a length greater than the spacing of the shafts 44 and 96 from the bed side edges 46 and 48. Preferably the shafts are closer spaced to one of the edges 48 whereby the lateral reach of the loader 10 is increased to such side. Obviously, the shafts 44 and 96 could be disposed along the side edge 48 if deemed expedient or desired.

An example of the versatility of the loader 10 is evident on inspection of FIG. 10. The member 20 can be moved to overlie a lateral row of bales on a high tier of bales and then optionally urged downwardly while the bale hooks 32 are forced from the full line to dashed line positions shown thereof in FIG. 4, after which the member 20 can be raised to lift such row of bales to the position shown thereof in full lines in FIG. 10. The shafts 44 and 96 can then be operated to position the arms 56 and 86 to the dashed line position shown thereof in FIG. 10 so that the row of bales rests upon the ground alongside the vehicle 12. The member 20 can then be lifted clear of the ground deposited row of bales after the hooks 32 are forced to their bale releasing positions.

As suggested previously, the support member 20 can be provided with many different types of load engaging and releasing means in lieu of the units 22–30 and the power means 134.

FIGS. 11 through 13 illustrate such a different embodiment wherein the elongated support member 20 previously described is replaced by an elongated support member 200 that is transversely of inverted "V" configuration inclusive of downwardly divergent top plates 202 and 204 that are joined at the opposite ends of the member 200 by triangular plates such as the one shown at 206 in FIGS. 12 and 13.

Aligned trunnions 208 and 210 are fixed to the opposite ends of the member 200 and are respectively journaled through the previously described secondary arms 84 and 86. The center of mass of the member 200 and of apparatus carried thereby is such in relation to the axis of the trunnions 208 and 210 that the member 200 tends to remain erect.

Spaced pairs of ears 212 are fixed along the plate 202 and a shaft 214 is journaled through such ears 212 in parallelism to the concentric shaft 44 and 96. A plurality of spaced arcuate tines 216 are fixed to the shaft 214 to oscillate therewith, with one of such tines 216 being disposed between the ears of each pair 212 of the latter. The other plate 204 of the member 200 is correspondingly provided with pairs of ears 218, rotatable shaft 220, and tines 222 fixed to the shaft 220, it being noted that there is a one-to-one correspondence between the series of tines 216 and 222 with each tine 222 being spaced only a minute interval, if at all, (with respect to the longitudinal extent of the support member 200) from direct opposition to its corresponding tine 216.

The arcuate tines 216 and 222 are substantially mirror images of each other, are arcuate in and move about the axes of the shafts 214 and 220 in vertical planes that are normal to the longitudinal extent of the member 200. It will be seen that the points 224 and 226 of the tines 216 and 222 are directed toward each other, and as will be evident on inspection of the drawings the tines 216 and 222 can be moved apart from the position shown thereof in FIG. 12 so that the points 224 and 226 are widely spaced apart and directed downwardly so as to release any hay which may have been carried thereon, such position being termed a hay releasing position.

Alternatively, the tines 216 and 222 can be moved from such releasing position to overlapping positions so as to extend through any loose hay which may be disposed therebetween. Such overlapping position entails the points 224 and 226 being directed upwardly and the tines may be termed to be in hay engaging position. Each pair of opposed tines 216 and 222 constitutes a loose hay engaging and releasing unit, it will be seen that the spacing of such units along the extent of the member is such that a continuous longitudinal mass of loose or unconsolidated hay can be engaged, lifted and released on appropriate movement of the shafts 44, 96, 214 and 220.

Yet to be described is a power means 230 for actuating the shafts 214 and 220. Such means comprises a pair of double-acting hydraulic cylinders 232 and 234 coupled to conventional operator control means, not shown. While such control means can be selected to enable individual control of the cylinders 232 and 234, it is preferred that such selection entail control means such as to actuate the cylinders 232 and 234 identically, that is, in synchronism.

The cylinders 232 and 234 are disposed above the member 200 and are pivoted at 236 and 238 to an upstanding bracket 240 disposed adjacent one end of the member 200. The cylinders 232 and 234 respectively are associated with piston rods 242 and 244 which respectively have their free ends pivoted as at 246 and 248 to one each of the pair of opposed tines 216 and 222 as clearly shown in the drawings. The piston rods directly act upon the tines to which they are pivoted and act indirectly through the agency of the shafts 214 and 220 to which all the tines 216 and all of the tines 222 are respectively fixed.

The use of the modification shown in FIGS. 11–13 shown does not require further elaboration, and accordingly, attention is directed to the appended claims.

I claim:

1. In load handling apparatus, a horizontal and elongated support member having a spatial orientation of its longitudinal extent, power means drivingly connected to opposite ends of the support member for laterally translating the latter selectively in all directions normal to the extent of the support member throughout a three-dimensional zone while positively maintaining the longitudinal spatial orientation thereof, said power means including a pair of rotatable and concentric shafts, with each of such shafts being essentially coextensive with and having its opposite ends operatively coupled respectively to the opposite ends of the support member, load engaging means extending along and carried by the support member for selectively engaging and releasing a load, said engaging means comprising a plurality of engaging units spaced along a major portion of the longitudinal extent of the support member, and means for operating all the units of said engaging means in unison, whereby a load of elongated form can be engaged at one location and moved to and released at a second location.

2. The combination of claim 1, wherein said units depend from the support member, and wherein said power means is connected to the support member by means for enabling the support member to retain substantially its upright orientation without rotation about its longitudinal axis, whereby a load below the support member can be engaged and whereby a load can be released below the support member.

3. The combination of claim 1, wherein the support member is pivotally supported adjacent its opposite ends about an axis parallel to its extent, and wherein the support member together with the units depending therefrom have a center of mass disposed below the pivotal support axis of the support member.

4. In load handling apparatus, a horizontal and elongated support member having a spatial orientation of its longitudinal extent, power means for laterally translating the support member throughout a three-dimensional zone while maintaining the longitudinal spatial orientation thereof, load engaging means extending along and carried by the support member for selectively engaging and releasing a load, and means for operating said engaging means, whereby a load of elongated form can be engaged at one location and moved to and released at a second location, power means including an elongated shaft disposed adjacent to the bottom of the zone in parallelism to the support member and mounted for oscillation about its longitudinal axis, means for oscillating said shaft, a pair of parallel primary arms fixed to and extending radially from the shaft adjacent its opposite ends, a pair of parallel secondary arms having first and second ends, with the first ends thereof being pivotally connected to the primary arms adjacent the free ends of the latter about a common axis that is parallel to the support member, said secondary arms being disposed intermediate the primary arms, said power means also including means for effecting pivotal movement of the secondary arms relative to the primary arms while maintaining the secondary arms parallel to each other, means connecting the support member to the second ends of the secondary arms so as to extend therebetween, said shaft being tubular and said means for pivotally moving the secondary arms including a secondary shaft extending through the tubular shaft, and means at each of the opposite ends of the secondary shaft drivingly connecting the latter to one of the secondary arms.

5. The combination of claim 4, wherein each of the means for drivingly connecting the secondary shaft to the secondary arms comprises chain and sprocket means.

6. The combination of claim 5, wherein said chain and sprocket means comprises a relatively large sprocket fixed to each of the secondary arms in axial alignment with its pivotal connection to the primary arm associated therewith, relatively smaller sprockets coaxial with and fixed to the secondary shaft, an endless chain entrained over each of the relatively smaller sprockets and one of the relatively larger sprocket.

7. The combination of claim 6, wherein a hydraulic power cylinder is drivingly connected to the tubular shaft for oscillating the latter about its axis, and a rotary hydraulic motor operatively connected to the secondary shaft for rotating the latter.

8. A loading machine comprising a wheeled vehicle that includes a horizontal load carrying bed having opposite ends, an elongated and horizontal tubular shaft mounted on the vehicle to extend between the opposite ends of the bed and for oscillation about its longitudinal axis, a pair of upstanding parallel arms fixed to the opposite ends of the tubular shaft, a pair of secondary arms having inner ends pivoted to upper ends of the primary arms about a common axis that is parallel to the tubular shaft, said secondary arms being disposed on the sides of the primary arms nearest to each other and having outer ends and an elongated horizontal support member parallel to the tubular shaft, with means connecting the opposite ends of the support member to the outer ends of the secondary arms, and means including a secondary shaft extending through the tubular shaft for maintaining the secondary arms parallel to each other, means for oscillating the tubular shaft and for effecting pivotal movement of the secondary arms relative to the primary arms, and means carried by and extending along the longitudinal extent of the support member for selectively engaging a load, whereby an elongated load can be loaded upon and removed from the bed throughout a zone having height and width respectively about twice and four times the length of a primary arm.

9. The combination of claim 8, wherein the bed has a lateral edge that is parallel to and spaced from the tubular shaft a horizontal distance that is less than the sum of the length of one of the primary arms and the secondary arm that is pivoted thereto, whereby the support member can be moved to overlie space laterally to one side of the bed.

10. The combination of claim 9, wherein the spacing is less than the length of the primary arm.

11. The combination of claim 8, wherein the secondary arms are shorter than the primary arms.

12. The combination of claim 8, wherein the means for maintaining the secondary arms parallel to each other comprises means drivingly connecting the opposite ends of the secondary shaft to the secondary arms.

13. The combination of claim 12, wherein the means drivingly connecting the secondary shaft to the secondary arms are chain and sprocket means.

14. The combination of claim 8, wherein the means for pivotally moving the secondary arms comprises power means for effecting rotation of the secondary shaft.

15. The combination of claim 14, wherein said power means includes a motor mounted on one of the primary arms.

* * * * *